United States Patent
Shiotani

(10) Patent No.: US 9,647,785 B2
(45) Date of Patent: May 9, 2017

(54) COMMUNICATION APPARATUS, SIGNAL PROCESSING METHOD, AND RECORDING MEDIUM STORING A SIGNAL PROCESSING PROGRAM

(71) Applicant: Yoshimitsu Shiotani, Kanagawa (JP)

(72) Inventor: Yoshimitsu Shiotani, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 163 days.

(21) Appl. No.: 14/554,182

(22) Filed: Nov. 26, 2014

(65) Prior Publication Data

US 2015/0146101 A1 May 28, 2015

(30) Foreign Application Priority Data

Nov. 27, 2013 (JP) ................................. 2013-245151

(51) Int. Cl.
*H04N 5/073* (2006.01)
*H04J 3/06* (2006.01)
*H04N 21/236* (2011.01)
*H04N 21/43* (2011.01)

(52) U.S. Cl.
CPC ...... *H04J 3/0697* (2013.01); *H04N 21/23611* (2013.01); *H04N 21/4305* (2013.01); *H04N 21/4307* (2013.01)

(58) Field of Classification Search
CPC .............................. H04J 3/0697; H04N 5/073
See application file for complete search history.

(56) References Cited

U.S. PATENT DOCUMENTS

| | | | | |
|---|---|---|---|---|
| 7,912,219 B1* | 3/2011 | Michener | ......... | H04N 21/26606 375/240.26 |
| 2007/0189315 A1* | 8/2007 | Aoyanagi | ........ | H04N 21/23406 370/412 |
| 2007/0217452 A1* | 9/2007 | Kato | ................ | H04N 21/23611 370/503 |
| 2011/0312373 A1 | 12/2011 | Shiotani | | |
| 2012/0063394 A1 | 3/2012 | Shiotani | | |
| 2012/0314639 A1 | 12/2012 | Shiotani | | |
| 2013/0250836 A1 | 9/2013 | Shiotani | | |

FOREIGN PATENT DOCUMENTS

JP  2009-177447  8/2009

* cited by examiner

*Primary Examiner* — Dave Czekaj
*Assistant Examiner* — Nam Pham
(74) *Attorney, Agent, or Firm* — Cooper & Dunham LLP

(57) ABSTRACT

In a communication system incorporating a communication apparatus that transfers/receives a TS packet using MPEG-2-TS to synchronize a video signal with an audio signal includes a communication circuit to pad the TS packet with a null frame to reach a prescribed frame size when storing the TS packet that includes a PCR value in a frame. In the communication apparatus, the communication circuit deletes the null frame in the TS packet when receiving the TS packet. The communication apparatus further includes an encoder that outputs a PCR report signal that indicates that the generated TS packet includes the PCR value to the communication circuit. In the communication apparatus, the size of the frame is set in multiples of the size of the TS packet. The communication apparatus further includes an input device to configure whether the TS packet is padded automatically or manually.

7 Claims, 6 Drawing Sheets

COMMUNICATION APPARATUS, SIGNAL PROCESSING METHOD, AND RECORDING MEDIUM STORING A SIGNAL PROCESSING PROGRAM

CROSS-REFERENCE TO RELATED APPLICATION

This patent application is based on and claims priority pursuant to 35 U.S.C. §119(a) to Japanese Patent Application No. 2013-245151, filed on Nov. 27, 2013 in the Japan Patent Office, the entire disclosure of which is hereby incorporated by reference herein.

BACKGROUND

Technical Field

The present invention relates to a communication apparatus, signal processing method, and a non-transitory recording medium storing a signal processing program.

Background Art

Many wired communication networks have come to be replaced by networks. In particular, with the release of apparatuses that have only a wireless communications interface, such as tablet devices and smartphones, it is projected that wireless communication networks will continue to be increasingly used. Accordingly, the speed of wireless communication networks has increased spectacularly in response to increasing demand. As a result, it has become possible to transfer large-volume data such as still images and video and real-time data such as audio wirelessly.

Wireless communication circuits in terminal devices incorporated in wireless communication systems (wireless transmitters and wireless receivers) perform communication in synchronization with a predetermined series of time slots. Furthermore, when transferring data including both video and audio signals in synchronized time slots wirelessly, it is necessary to synchronize an encoder in the wireless transmitter with a decoder in the wireless receiver in order to synchronize the video signal with the audio signal.

MPEG-2 Transport Stream (TS) technology is one widely used technique for synchronizing the video signal with the audio signal and is used in fields such as digital broadcasting to compress TS packets that include the video signal and the audio signal using MPEG-2 and H.264 formats. In addition to the video signal and the audio signal, various other data is stored in the TS packets, including a Program Clock Reference (PCR) value. The PCR value indicates current time information of the encoder. The decoder controls output timing of the video signal and audio signal by adjusting an internal timer value using the PCR value and synchronizes the video signal with the audio signal.

By adopting MPEG-2-TS in the wireless communication system, it is possible to perform encoding and decoding of data in real time. However, in order to implement high-quality encoding and decoding in real time, it is necessary to minimize packet dropout and absorb fluctuations in propagation time because, in some cases the quality of the video signal and audio signal cannot be maintained.

In MPEG-2-TS, as described above, the decoder absorbs any skew in the clock signal to track the time information of the encoder using the PCR value, and the decoder is synchronized with the encoder. However, if the propagation time of the TS packet that stores the PCR value varies, its arrival time also varies, and the time information of the encoder acquired from the PCR value varies as well. In this case, since the decoder follows the varied time, oscillating frequency of the clock signal goes up and down substantially, resulting in distorting the video signal and causing color shift. To cope with this issue, the MPEG-2-TS specifications stipulate that PCR tolerance is to be kept to within several tens of μsec.

Generally, the size of the wireless transferred frame is different from the size of the TS packet. While the size of the TS packet is 188 bytes or 204 bytes, the maximum frame size for wireless LAN defined in IEEE 802.11a/b/g is 2304 bytes. In IEEE 802.11n, aggregation and other techniques are used for enhancing wireless speed, and the maximum frame size is 65535 bytes.

In MPEG-2-TS, a null frame is used as one type of TS packet if there is no TS packet transferred for adjusting bit rate, etc. Since this null frame is meaningless information that has no relation to wireless transferred media information and the network bandwidth is squeezed if lots of null frames are included, it is ideal that no null frame is included.

However, when not using the null frame, if the TS packet that includes the PCR value is generated and stored in the wireless frame, in some cases, the predetermined frame size is not reached, and there is no subsequent TS packet for a certain period of time. In this case, the TS packet that includes the PCR value cannot be wireless transferred. As a result, the propagation time in wireless transmission fluctuates substantially. For example, a case in which the boundary of TS packetized video ES data does not correspond to the boundary of the size of the wireless frame is one of those cases.

SUMMARY

An example embodiment of the present invention provides a novel communication apparatus that transfers/receives a TS packet using MPEG-2-TS in order to synchronize a video signal with an audio signal and includes a communication circuit to pad the TS packet with a null frame to reach a prescribed frame size when storing the TS packet that includes a PCR value in a frame.

Further example embodiments of the present invention provide a signal processing method, and a non-transitory recording medium storing a signal processing program.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

DETAILED DESCRIPTION

Figure 1:
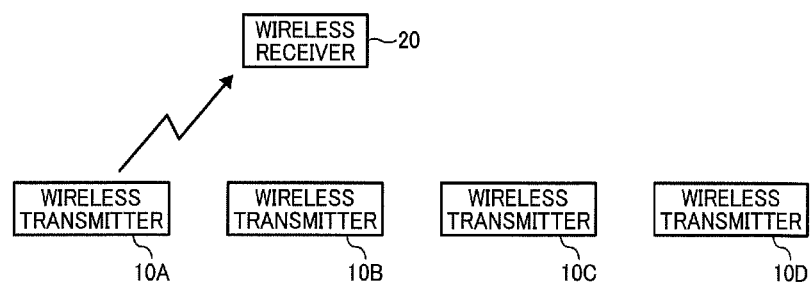
FIG. 1 is a schematic diagram illustrating a wireless communication system as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In wireless communication systems, it is preferable to avoid wireless transferring null frames since that squeezes wireless transferring bandwidth along with other problems. However, in those cases, if there is no TS packet following the TS packet that includes the PCR value or TS packets are not generated for a certain period of time, the wireless frame that includes the PCR value cannot be transferred since a predetermined-sized wireless frame cannot be generated. As a result, the fluctuations in the propagation time in wireless transmission increase, and it is impossible to synchronize the video signal with the audio signal.

For example, in the conventional technologies, when generating coded data that compresses image data using a codec, the coded data output from the coded is padded in order to correspond to a predetermined size. By padding the coded data before packetization, there is no need to wait to transfer via a network since the coded data is shorter than the predetermined size on the network side, and it is possible to transfer the TS packet at short delay. However, if the size of the coded data is not in multiples of the predetermined size, the size of padded data becomes large since the data is padded for each of the coded data, and it is possible to squeeze the network bandwidth. In addition, by padding the coded data, since it is not needed to delete the padded data at the receiver side until the data is expanded, it is needed to perform TS processing the data including the padding data.

In the following embodiment, a wireless communication apparatus that can minimize the transfer delay of the frame that includes the TS packet including the PCR value and reduce the fluctuations in the propagation time in the communication system is provided.

FIG. 1 is a schematic diagram illustrating a wireless communication system in the first embodiment. The wireless communication system in FIG. 1 includes multiple wireless transmitters 10A, 10B, and 10C and a wireless receiver 20 and transfers the TS packets of MPEG-2 wirelessly. Examples of the wireless transmitters 10A, 10B, and 10C are a tuner and a DVD player etc. The wireless transmitters 10A, 10B, and 10C acquires input data that includes the video signal and audio signal (ES data), encodes it to the TS packet, and transfers a wireless frame that includes the TS packet to the wireless receiver 20 wirelessly. The wireless receiver 20 includes a display and a speaker for example. The wireless receiver 20 decodes the TS packet included in the wireless frame received from any one of the wireless transmitters 10A, 10B, and 10C wirelessly, acquires the original video signal and audio signal, synchronizes them, and outputs them from the display and the speaker.

In the wireless transfer system in this embodiment, MPEG-2-TS is used for transferring the video signal synchronized with the audio signal. When transferring the PCR value used for the synchronization on the decoder side of MPEG-2-TS wirelessly, if the wireless frame that contains the TS packet including the PCR value is smaller than the predetermined wireless frame size, the wireless frame is padded using null frames. As a result, it is possible to transfer the PCR value wirelessly at small delay.¥

Figure 2:
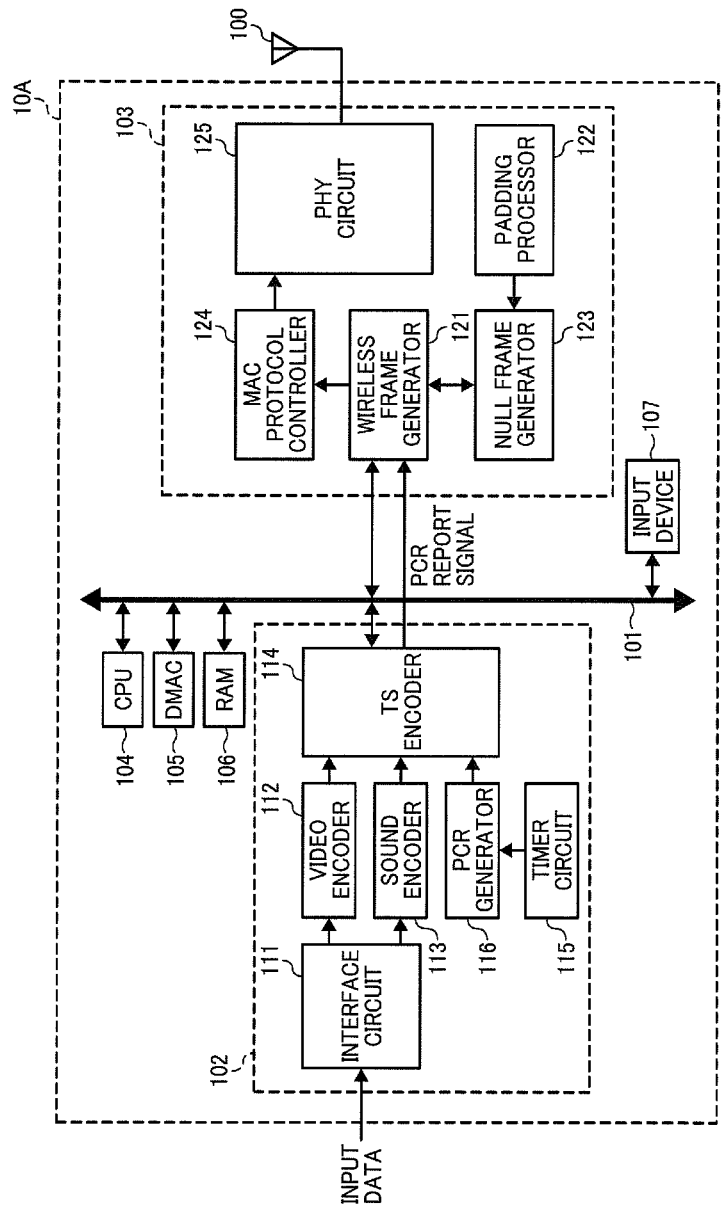
FIG. 2 is a block diagram illustrating a detailed configuration of a wireless transmitter in FIG. 1.

FIG. 2 is a block diagram illustrating a detailed configuration of the wireless transmitter 10A shown in FIG. 1. The wireless transmitter 10A includes an antenna 100, bus 101, encoding circuit 102, wireless communication circuit 103, CPU 104, DMA controller (DMAC) 105, RAM 106, and input device 107.

In FIG. 2, the CPU 104 controls the whole operation of the wireless transmitter 10A, and the input device 107 includes a keyboard and a mouse to configure whether or not a padding processor 122 in the wireless transmitter 10A performs the padding by user operation. The encoding circuit 102 includes an interface circuit 111, video encoder 112, sound encoder 113, TS encoder 114, timer 115, and PCR generator 116. An example of the interface circuit 111 is HDMI interface etc. The interface circuit 111 separates the input data into the video signal and the audio signal and transfers the video signal to the video encoder 112 and the audio signal to the sound encoder 113. The video encoder 112 compresses the video signal and transfers it to the TS encoder 114. The sound encoder 113 compresses the audio signal and transfers it to the TS encoder 114. The TS encoder 114 generates a TS packet that includes the compressed video signal and audio signal, and the DMA controller 105 transfers the TS packet to the RAM 106 using DMA transfer. The PCR generator 116 generates the PCR value as current time information of the encoder circuit 102 based on a counter value (timer value) provided by the timer 115 and transfers it to the TS encoder 114. The TS encoder 114 generates the TS packet including the PCR value at a constant frequency, and the DMA controller 105 transfers the TS packet including the PCR value to the wireless communication circuit 103 using DMA transfer. When generating the PCR packet, the TS encoder 114 outputs a PCR report signal that reports that the TS packet DMA-transferred is a PCR to a wireless frame generator 121 in the wireless communication circuit 103.

The wireless communication circuit 103 includes the wireless frame generator 121, a padding processor 122, a null frame generator 123, a MAC protocol controller 124, and a PHY circuit 125 as a wireless physical layer circuit. The MAC protocol controller 124 generates information on timing of transferring the wireless frame (signal) that the wireless frame generator 121 generates, generates a beacon frame for synchronizing the wireless network etc., and transfers them to the PITY circuit 125. The PHY circuit 125 performs modulation, frequency conversion to an analog wireless signal, and amplification etc. on the wireless frame input from the MAC protocol controller 124, and the PHY circuit 125 transfers the wireless signal including transfer information of the wireless frame wirelessly. In addition, if it is configured to perform the padding using the input device 107 by user operation (including the case configured as default), the PCR report signal that reports that the TS packet transferred from the TS encoder 114 is PCR is received. In that case, the wireless frame generator 121 reports insufficient data size needed for constructing the wireless frame to the null frame generator 123. Subsequently, the wireless frame generator 121 generates and outputs the wireless frame generating multiple null frames using the null frame generator 123 and padding using the padding processor 122.

Figure 3:
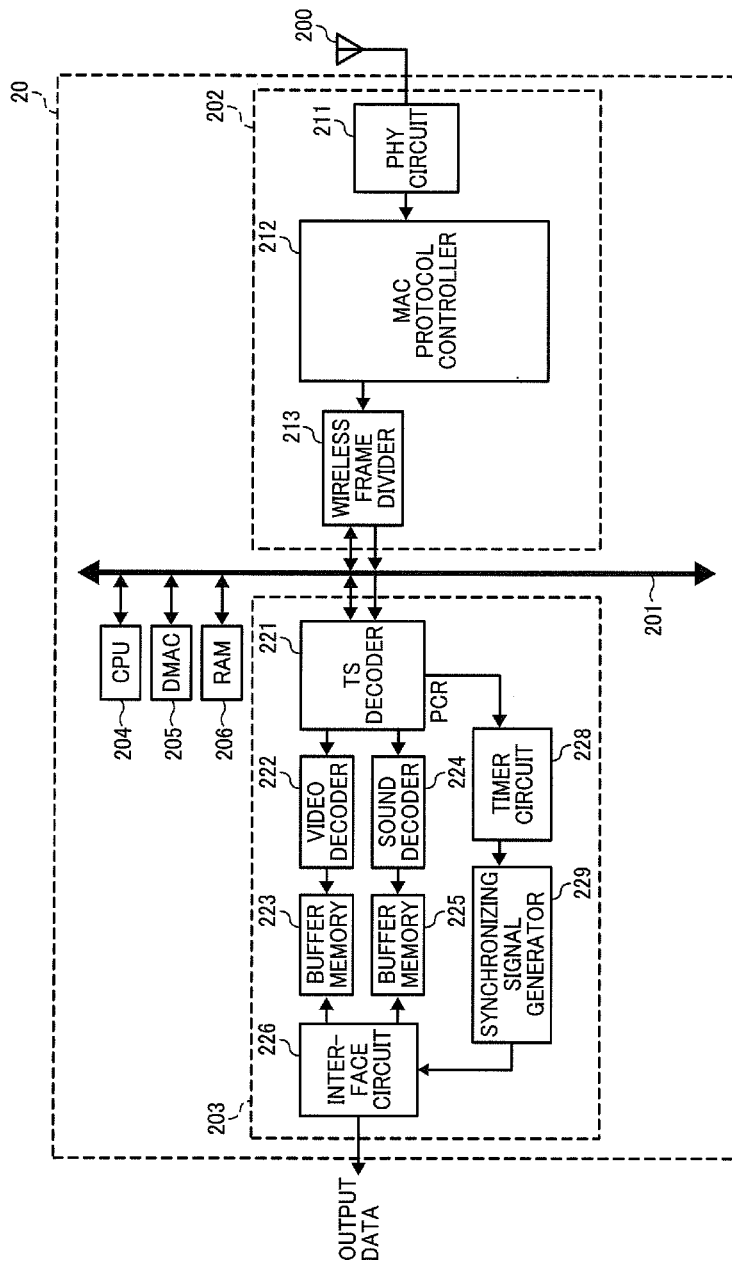
FIG. 3 is a block diagram lustrating a detailed configuration of a wireless receiver in FIG. 1.

FIG. 3 is a block diagram illustrating a detailed configuration of the wireless receiver 20 shown in FIG. 1. The wireless receiver 20 includes an antenna 200, bus 201, wireless communication circuit 202, decoding circuit 203, CPU 204, DMA controller 205, and RAM 206.

In FIG. 3, the wireless communication circuit 202 includes a PHY circuit 211, MAC protocol controller 212, and wireless frame divider 213. The PHY circuit 211 receives the wireless frame and beacon frame transferred from the wireless transmitter 10A wirelessly via the antenna 200. The PHY circuit 211 performs low noise amplification, frequency conversion, A/D conversion and decodes the received wireless frame, and the PHY circuit 211 transfers the decoded baseband signal to the MAC protocol controller 212. The MAC protocol controller 212 performs analysis of MAC header and detection of error on the input baseband signal. When detecting no error from the wireless frame (signal), the wireless frame (signal) is input into the wireless frame divider 213. The wireless frame divider 213 divides the input wireless frame in units of TS packets and transfers them to the TS decoder 221 or the RAM 206 using DMA transfer.

The decoding circuit 203 includes a TS decoder 221, video decoder 222, buffer memory 223, sound decoder 224, buffer memory 225, interface circuit 226, adder 227, timer 228, and synchronizing signal generator 229. The TS packet stored in the RAM 206 is transferred to the TS decoder 221 using DMA transfer. The TS decoder 221 separates the TS packet into the video signal and audio signal. The TS decoder 221 transfers the video signal to the video decoder 222 and the audio signal to the sound decoder 224. The video decoder 222 expands the video signal and stores it in the buffer memory 223 temporarily. The sound decoder 224 expands the audio signal and stores it in the buffer memory 225 temporarily. If the TS packet includes the PCR value, the TS decoder 221 extracts the PCR value. The extracted PCR value is corrected by adding the delay time by adder 227, and the corrected PCR value is transferred to the timer (System Time Clock) 228. The timer 228 adjusts its own count value (timer value) by comparing the input PCR value and transfers the adjusted count value to the synchronizing signal generator 229. Based on the input count value, the synchronizing signal generator 229 generates a synchronizing signal for synchronizing the video signal and audio signal and transfers it to the interface circuit 226. An example of the interface circuit 226 is HDMI interface etc. The interface circuit 226 reads the video signal and audio signal stored in the buffer memories 223 and 225 and generates output data synchronizing the video signal and audio signal based on the synchronizing signal.

Figure 4:
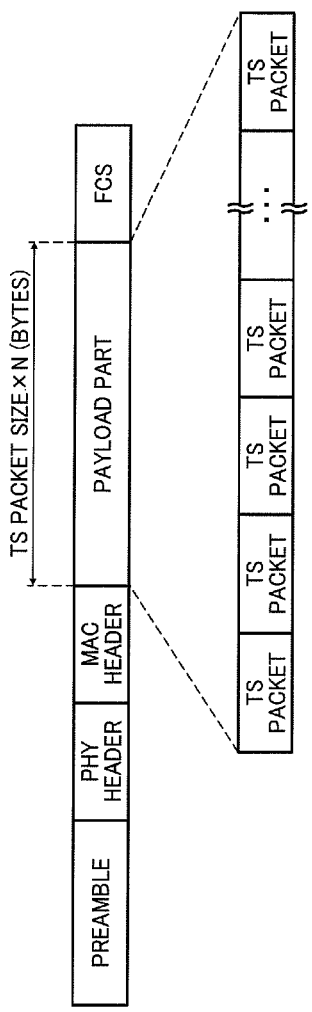
FIG. 4 is a diagram illustrating a format of a wireless frame transferred in the wireless communication system in FIG. 1.

FIG. 4 is a diagram illustrating format of a wireless frame transferred in the wireless communication system shown in FIG. 1. The wireless frame includes a preamble, PHY header, MAC header, payload, and FCS field. The payload includes one or more TS packets. Each TS packet includes a TS header and TS payload, and compressed (or not compressed) video signal or audio signal is stored in the TS payload. If the TS packet includes the PCR value, the PCR value is stored in an adaptation field in the TS header. In this case, the payload size is configured in multiples of the TS packet size. As a result, it is possible to construct the wireless frame in units of the TS packet, it is possible to simplify the signal processing, and there is no need to regenerate one TS packet from multiple wireless frames on the receiver side.

Figure 5:
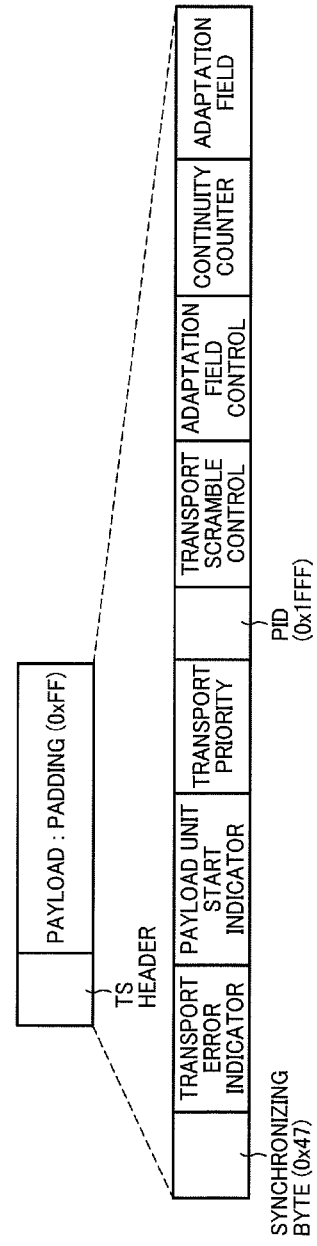
FIG. 5 is a diagram illustrating a format of the wireless frame in FIG. 4.

FIG. 5 is a diagram illustrating a format of the wireless frame in FIG. 4 and illustrates a configuration of the null frame in the TS packet. In FIG. 5, the TS packet consists of the TS header and the payload. The TS header includes a PID field that indicates the packet type and corresponds to 0x1FFF in case of the null frame. The payload is padded with 0xFF in case of the null frame. The continuity counter value increments by one for each packet and is used for error detection on the receiver side.

Figure 6:
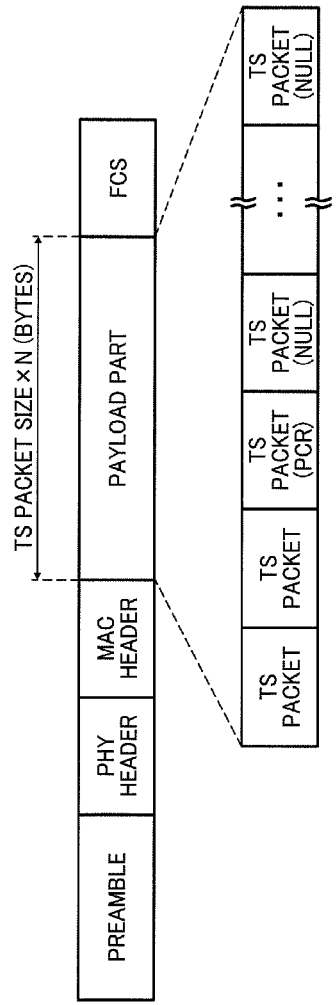
FIG. 6 is a diagram illustrating a format of a wireless frame padded by a wireless frame generator in FIG. 2.

FIG. 6 is a diagram illustrating a format of the wireless frame padded by the wireless frame generator 121 in FIG. 2. In FIG. 6, when generating the PCR packet using the TS encoder, the PCR packet is transferred to the wireless communication Circuit 103 in FIG. 2, and the PCR report signal that reports that the transferred data is the PCR packet to the wireless communication circuit 103 simultaneously. The wireless frame generator 121 stores multiple TS packets and generates the wireless frame. However, when the wireless frame generator 121 stores the PCR packet in the wireless frame, the wireless frame generator 121 pads the remaining size needed to construct the wireless frame size with null packets, and the wireless frame generator 121 generates the wireless frame and outputs it to the MAC protocol controller 124. It is preferable to configure the wireless frame size in multiples of the TS packet size to simplify the process.

Figure 7:
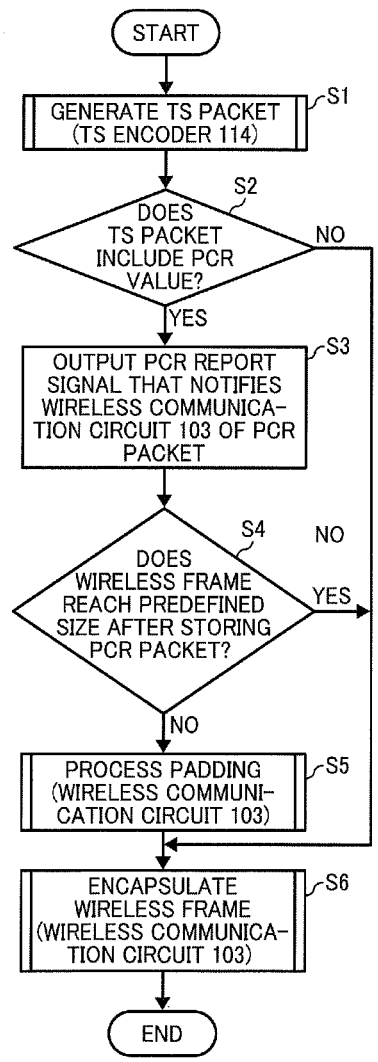
FIG. 7 is a flowchart illustrating a wireless transmission process performed by the wireless transmitter in FIG. 2.
Figure 8:
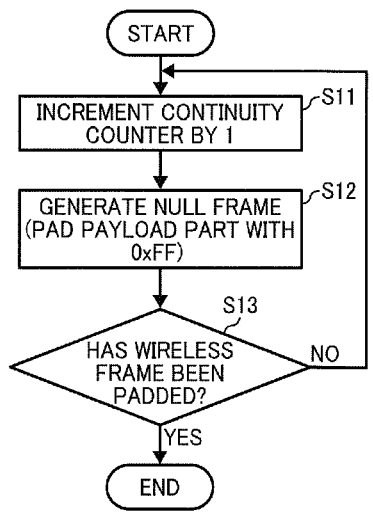
FIG. 8 is a flowchart illustrating a padding process as a subroutine in FIG. 7.

FIG. 7 is a flowchart illustrating a wireless transmission process performed by the wireless transmitter 10A in FIG. 2. FIG. 8 is a flowchart illustrating a padding process as a subroutine in FIG. 7.

In FIG. 7, the TS encoder 114 generates the TS packet in S1. When generating the PCR packet (YES in S2), the PCR report signal that reports that the PCR packet is transferred is output to the wireless communication circuit 103 in S3. When generating other TS packets, nothing is reported to the wireless communication circuit 103, and the report signal is not output (NO in S2). Subsequently, if the wireless communication circuit 103 receives the PCR report signal in S4, the wireless communication circuit 103 measures the size of the wireless frame at the time when the PCR packet is stored in the wireless frame. If the size of the wireless frame becomes a predetermined size at the time when the PCR packet is stored (YES in S4), the wireless frame is output to the MAC protocol controller 124 without padding. If the size of the wireless frame does not become a predetermined size at the time when the PCR packet is stored (NO in S4), null packets corresponding to the insufficient size are generated and padded in the end part of the PCR packet in S5. Subsequently the wireless frame is encapsulated in S6.

In the padding process shown in FIG. 8, when generating null frames, the continuity counter of the TS header in the null frame is incremented by one in S11. Subsequently, the null frame is generated by padding the payload with 0xFF in S12. It is determined whether or not the padding process is performed for the size of the wireless frame in S13. If padding is not finished, the process returns to S11 and the padding process continues. If padding is finished, the process returns to the original routine. Subsequently, the counter value set to the last null frame is reported to the TS encoder 114. The TS encoder 114 increments the continuity counter from the reported counter value.

If the wireless receiver 20 in FIG. 3 receives the padded wireless frame, the wireless frame is divided in units of the TS packet by the wireless frame divider 213 and input into the TS decoder 221. In this case, since the null frames are discarded by the TS decoder 221, it is unnecessary that the wireless communication circuit deletes the padded field intentionally.

In the above description, it is possible that the null frames are generated by the TS encoder 114 and transferred to the wireless communication circuit 103 in order to adjust bitrate. In this case, it is preferable that it is configurable that the wireless communication circuit 103 does not perform the padding process using the input device 107 by user operation.

In the above description, the wireless communication standard of the wireless communication circuits 103 and 202 is not particularly defined. It is possible to adopt the wireless communication standard that the embodiment described above can be applied.

In the above description, the wireless signal that includes the wireless frames is transferred/received using wireless communication. However, the present invention is not limited to that, and it is possible that the wired signal that includes the wired frames is transferred/received using wired communication. That is, the present invention can be applied to the wired communication system that includes the wired communication apparatus including the wired transmitter and the wired receiver.

In the above description, the wireless transmitter 10A in FIG. 2 and the wireless receiver 20 in FIG. 3 include the interface circuits 111 and 226 as HDMI interface. However, other interfaces that can input/output the video signal and audio signal can be used.

The communication apparatus in the first embodiment transfers/receives the TS packet using MPEG-2-TS in order to synchronize the video signal with the audio signal. When storing the TS packet that includes the PCR value in the frame, the communication apparatus includes the communication circuit that pads the TS packet with null frames to the frame size.

In the second embodiment, in the communication apparatus according to the first embodiment, the communication circuit deletes null frames in the TS packet when receiving the TS packet.

In the third embodiment, the communication apparatus according to the first embodiment further includes the encoder that outputs the PCR report signal that indicates that the generated TS packet includes the PCR value to the communication circuit.

In the fourth embodiment, in the communication apparatus according to the first embodiment, the size of the frame is set in multiples of the size of the TS packet.

In the fifth embodiment, the communication apparatus according to the first embodiment further includes the input device that configures whether or not the padding process is performed by user operation.

Numerous additional modifications and variations are possible in light of the above teachings. It is therefore to be understood that, within the scope of the appended claims, the disclosure of this patent specification may be practiced otherwise than as specifically described herein. For example, it is possible that the image forming apparatus includes the document holding determination unit only. Alternatively, it is possible that the image forming apparatus includes the document holding determination unit and any one of or any combination of the rangefinder, the user authentication unit, the recovery processor, the print job acquisition unit, the auxiliary parameter setting unit, and the facsimile number setting unit.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor. A processing circuit also includes devices such as an application specific integrated circuit (ASIC) and conventional circuit components arranged to perform the recited functions.

What is claimed is:

1. A communication apparatus that transfers/receives a TS packet using MPEG-2-TS to synchronize a video signal with an audio signal, the communication apparatus comprising:
   a communication circuit to add a null frame to the TS packet to reach a prescribed frame size when the TS packet includes a PCR value and is not the prescribed frame size, and to generate the TS packet without adding a null frame to the TS packet when the TS packet does not include a PCR value.

2. The communication apparatus according to claim 1, wherein the communication circuit deletes the null frame in the TS packet when receiving the TS packet.

3. The communication apparatus according to claim 1, further comprising an encoder that outputs a PCR report signal that indicates that the generated TS packet includes the PCR value to the communication circuit.

4. The communication apparatus according to claim 1, wherein the size of the frame is set in multiples of the size of the TS packet.

5. The communication apparatus according to claim 1, further comprising an input device to configure whether the TS packet is padded automatically or manually.

6. A method of processing a signal for transferring/receiving a TS packet using MPEG-2-TS to synchronize a video signal with an audio signal, the method comprising:
   adding a null frame to the TS packet to reach a prescribed frame size when the TS packet includes a PCR value and is not the prescribed frame size; and
   generating the TS packet without adding a null frame to the TS packet when the TS packet does not include a PCR value.

7. A non-transitory, computer-readable recording medium storing a program that, when executed by a processor, causes the processor to implement a method of processing a signal for transferring/receiving a TS packet using MPEG-2-TS to synchronize a video signal with an audio signal, the method comprising:
   adding a null frame to the TS packet to reach a prescribed frame size when the TS packet includes a PCR value and is not the prescribed frame size; and
   generating the TS packet without adding a null frame to the TS packet when the TS packet does not include a PCR value.

* * * * *